United States Patent [19]

Dewey

[11] Patent Number: 5,404,697
[45] Date of Patent: Apr. 11, 1995

[54] ROTATABLE MACHINERY SYSTEM HAVING ANTI-WRAP WASHER

[75] Inventor: Robert A. Dewey, Dixon, Ill.

[73] Assignee: Woods Equipment Corporation, Oregon, Ill.

[21] Appl. No.: 128,302

[22] Filed: Sep. 28, 1993

[51] Int. Cl.⁶ .............................................. A01D 34/68
[52] U.S. Cl. ...................................... 56/12.7; 56/17.5
[58] Field of Search ............... 411/162, 163, 164, 957, 411/959; 56/17.5, 12.1, 12.7

[56] References Cited

U.S. PATENT DOCUMENTS

| | | | |
|---|---|---|---|
| 4,124,938 | 11/1978 | Ballas, Sr. | 56/12.7 |
| 4,145,809 | 3/1979 | Proulx | 56/12.7 |
| 4,258,536 | 3/1981 | Kidd et al. | 56/17.5 |
| 4,771,593 | 9/1988 | Lee | 56/17.5 |
| 5,313,770 | 5/1994 | Smothers | 56/12.7 |

*Primary Examiner*—Edward K. Look
*Assistant Examiner*—Mark Sgantzos
*Attorney, Agent, or Firm*—Foley & Lardner

[57] ABSTRACT

A rotatable machinery system including a washer, the washer including a flange for keeping debris from contacting both rotating and stationary elements. The rotatable machinery system includes a rotatable cross member, a drive shaft coupled to the cross member, a bearing including a bearing housing, and a drive device for rotating the drive shaft. The bearing housing and drive shaft form a circumferential junction. The flange of the washer covers at least a portion of the junction, the washer turning responsive to the drive shaft.

33 Claims, 4 Drawing Sheets

5,404,697

ROTATABLE MACHINERY SYSTEM HAVING ANTI-WRAP WASHER

BACKGROUND OF THE INVENTION

The present invention relates to a rotatable machinery system. The present invention more particularly relates to a rotatable machinery system including a rotatable cross member, a drive shaft coupled to the cross member, drive means for rotating the drive shaft and having a bearing forming a circumferential bearing junction with the drive shaft, and a washer for protecting the junction. The invention further relates to a washer for use with such a rotatable machinery system.

In a rotatable machinery system, a drive means provides power to rotate a drive shaft. The drive shaft, in turn, is coupled to other elements to perform work. For example, the drive shaft may be coupled to a crossbar for turning the crossbar. Generally, the drive means and drive shaft are coupled through a bearing, which provides reduced friction and shock absorption.

Rotatable machinery systems include both rotating and stationary components. Rotating components include drive shafts and crossbars. Stationary components include gearbox housings and bearings. In the environment in which many rotatable machinery systems are used, it is a frequent occurrence for debris to wrap around both rotating and stationary components. Both stationary and rotating components may be damaged by such debris.

One example of such a rotary equipment system is a rotary cutter for use in agricultural applications or as a mower. In such a system, a drive means such as an engine, motor or gearbox rotates a drive shaft. The drive shaft is coupled to a crossbar and the crossbar is in turn coupled to a cutting blade. As a result, when the drive shaft is rotated, the cutting blade is also rotated to cut grass, weeds or crops. The cutting blade may be covered by a deck plate or housing to prevent operator injury and to prevent the throwing of stones and other debris. The deck plate has an open bottom to allow the cutting blades to contact the grass, weeds or crops.

In such an environment, some debris may not be cut but may instead wrap around the rotary cutter. Debris such as wires, vines, string and plastic may be drawn into the housing or deck plate. This debris may wrap tightly about stationary components, such as the drive means, as well as rotating components such as the crossbar. Thus wrapped tightly, the debris may be rotated by the crossbar and dragged around stationary surfaces. The resulting friction and buildup of heat may cause damage to the drive means. Also, breakable components such as bearings may be damaged.

Therefore, there is a need in the art for a rotary machinery system immune to damage from debris wrapped around both rotary and stationary elements. Further, there is a need for an anti-wrap washer for use in conjunction with such a rotary machinery system for preventing debris which becomes wrapped around rotating elements from contacting stationary elements. The present invention provides such a rotary machinery system and washer by providing a system having a washer including flange means for keeping debris from contacting both rotating and stationary elements.

SUMMARY OF THE INVENTION

The present invention provides a rotatable machinery system. The rotatable machinery system includes a rotatable cross member, a drive shaft coupled to the cross member, drive means for rotating the drive shaft, the drive means including a bearing forming a circumferential junction with the drive shaft, and a washer, the washer having a substantially planar, ring-shaped body coaxial with the drive shaft and rotating responsive to the drive shaft, and flange means extending from the body for covering at least a portion of the junction.

The invention further provides a rotary cutter. The rotary cutter includes a rotatable member including a cutting blade, a rotatable drive shaft for rotating the member, drive means for rotating the drive shaft, the drive means being coupled to the drive shaft through a bearing coaxial with the drive shaft, and a washer for protecting the bearing, the washer including an annular disk coupled to and coaxial with the drive shaft and rotating with the drive shaft, the annular disk having a proximate face adjacent the drive means and an outer perimeter, and flange means extending from the outer perimeter toward the drive means for covering the bearing.

The invention still further provides a washer for use in rotatable machinery, the rotatable machinery having a rotatable member, a rotatable drive shaft for rotating the member, and drive means for rotating the drive shaft, the drive shaft being coupled to the drive means through a bearing coaxial with the drive shaft. The washer includes an annular disk for being coupled to and coaxial with the drive shaft and rotating with the drive shaft, the annular disk having a proximate face adjacent the drive means and an outer perimeter, and flange means extending from the outer perimeter toward the drive means for covering the bearing.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENTS

Figure 1:
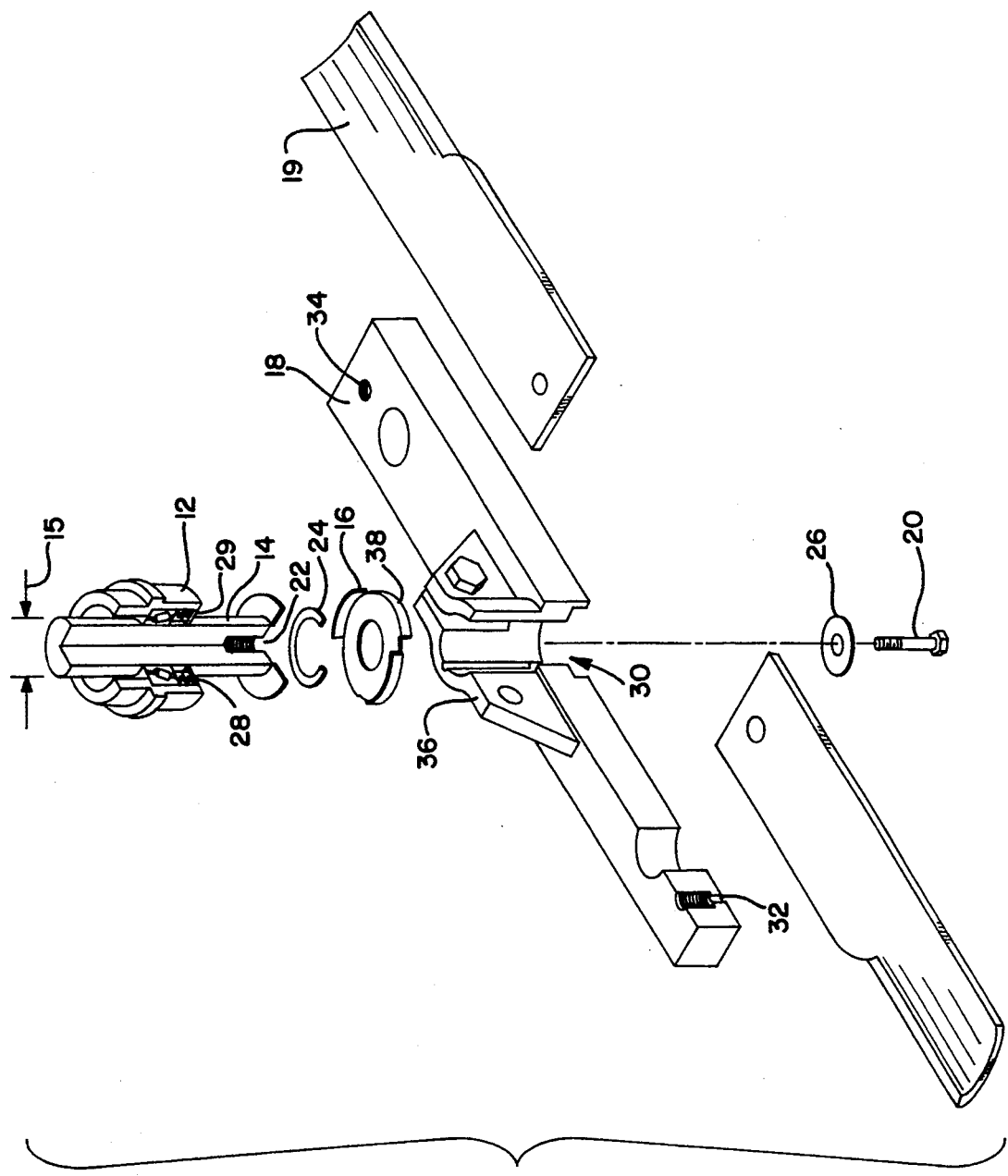
FIG. 1 is an exploded perspective view of a rotary machinery system, in partial cutaway, embodying the present invention.

Referring now to FIG. 1, it is an exploded perspective view in partial cutaway, illustrating a rotary machinery system 10 embodying the present invention.

The system 10 generally includes a bearing housing 12, a drive shaft 14, a washer 16, a rotatable member or crossbar 18 and cutting blade 19. The system 10 further includes a bolt 20 having a threaded end which passes through the crossbar 18 and the washer 16 to engage a threaded socket 22 at the end of the drive shaft 14. The system 10 may further include washers 24 and 26 for securing the crossbar 18 to the drive shaft 14.

The drive shaft 14 may be driven by a drive means (not shown in FIG. 1). The drive means may be an electric motor or an engine for rotating the drive shaft 14. Further, the drive means may include a gearbox or differential or any other equipment in the drive train between the motor or engine and the drive shaft 14, forming a means for rotating the drive shaft.

The drive shaft 14 rotates supported by a bearing 28 within the bearing housing 12. The bearing 28 is preferably coaxial with the drive shaft 14 and provides low-friction support for the drive shaft 14. As shown in FIG. 1, the drive shaft 14 has a circular cross-section 13. The drive shaft 14 has a maximum cross-section length or dimension 15. However, it will be understood by those skilled in the art that the drive shaft 14 may have a cross-section other than that illustrated which may include any number of straight sides, to define a square, hexagonal or octagonal cross-section, for example. Without regard to the cross-sectional shape of the drive shaft 14, a circumferential junction 29 is formed between the drive means 12 and the drive shaft 14.

As shown in FIG. 1, the crossbar 18 includes a hole 30 for receiving the bolt 20 for coupling the crossbar 18 to the drive shaft 14. As will be understood by those skilled in the art, the hole 30 may be such as to receive the end of the drive shaft 14 for coupling the crossbar 18 to the drive shaft 14. Thus, the crossbar 18 is preferably rotatably coupled to the end of the drive shaft 14. The crossbar 18 may further be configured for coupling to other equipment, not shown, for performing work. For example, the system 10 may form a rotary cutter, wherein one or more cutting blades 19 are attached to the crossbar 18. The crossbar 18 includes mounting means 32 and 34 for mounting equipment such as cutting blade 19 to the crossbar for performing work. The crossbar 18 may further include a reinforcing brace 36 for assuring the crossbar 18 is securely coupled to the drive shaft 14.

The washer 16 preferably includes one or more legs 38. As shown in FIG. 1, the legs 38 of the washer 16 are configured for fitting over and around the reinforcing brace 36. The legs 38 thus form a means for engaging the cross member 18. When the cross member 18 rotates responsive to the drive shaft 14, the legs 38 engage the reinforcing brace 36 of the crossbar 18, causing the washer 16 to rotate in response to the rotation of the crossbar 18.

Figure 2:
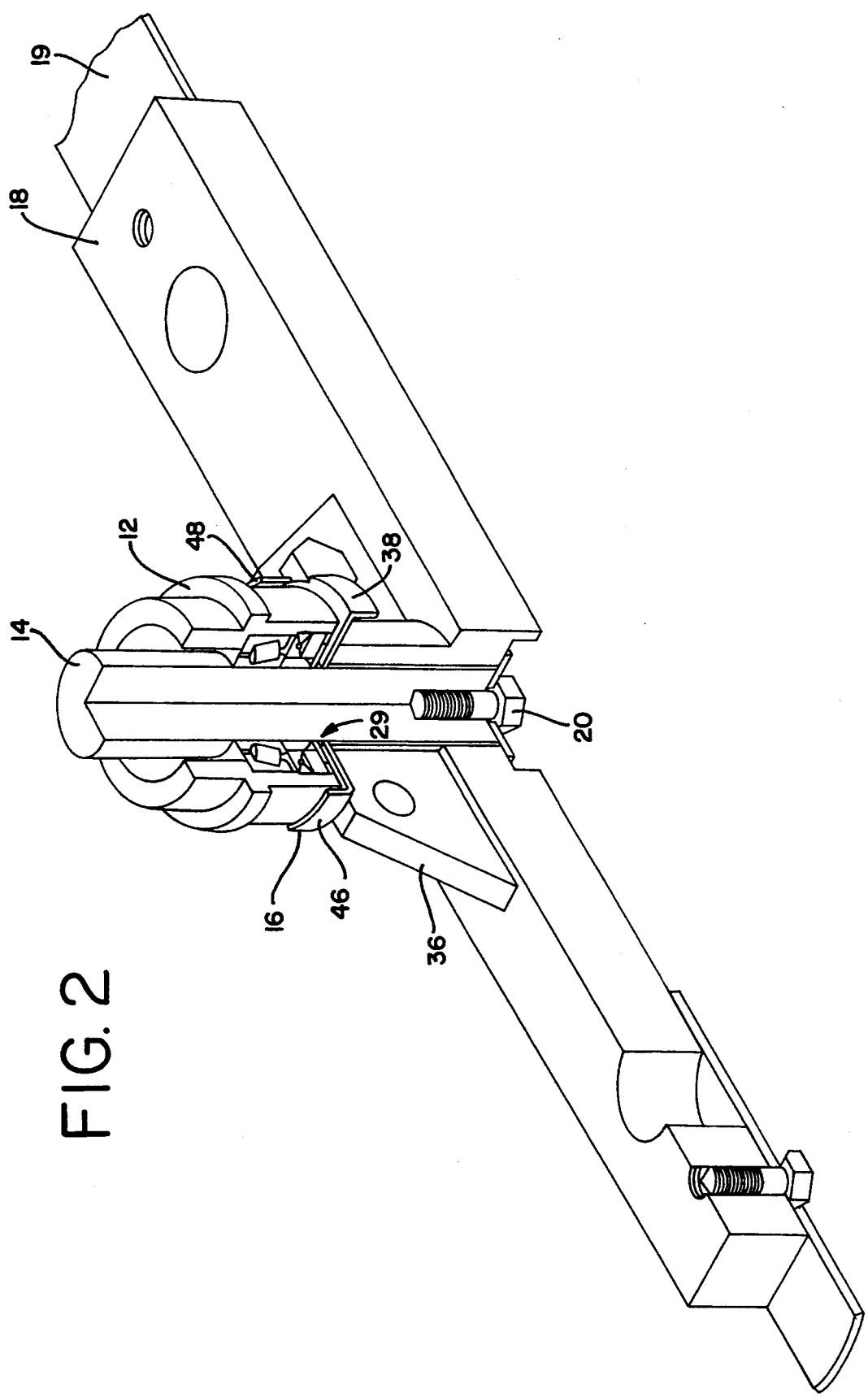
FIG. 2 is a perspective view, in partial cutaway, of the assembled rotary machinery system of FIG. 1.

Referring now to FIG. 2, it illustrates a perspective view, in partial cutaway, of the assembled rotary machinery system of FIG. 1. FIG. 2 shows the crossbar 18 coupled to the end of the drive shaft 14, which passes through the crossbar 18 and is secured to the crossbar 18 by bolt 20. FIG. 2 further shows the bearing housing 12 forming the junction 29 with the drive shaft 14. At least a portion of the junction 29 is covered by the flange sections 46 and 48 of the washer 16. The washer 16 also includes legs 38 which engage the reinforcing brace 36 of the crossbar 18 to cause the washer 16 to rotate.

Figure 3:
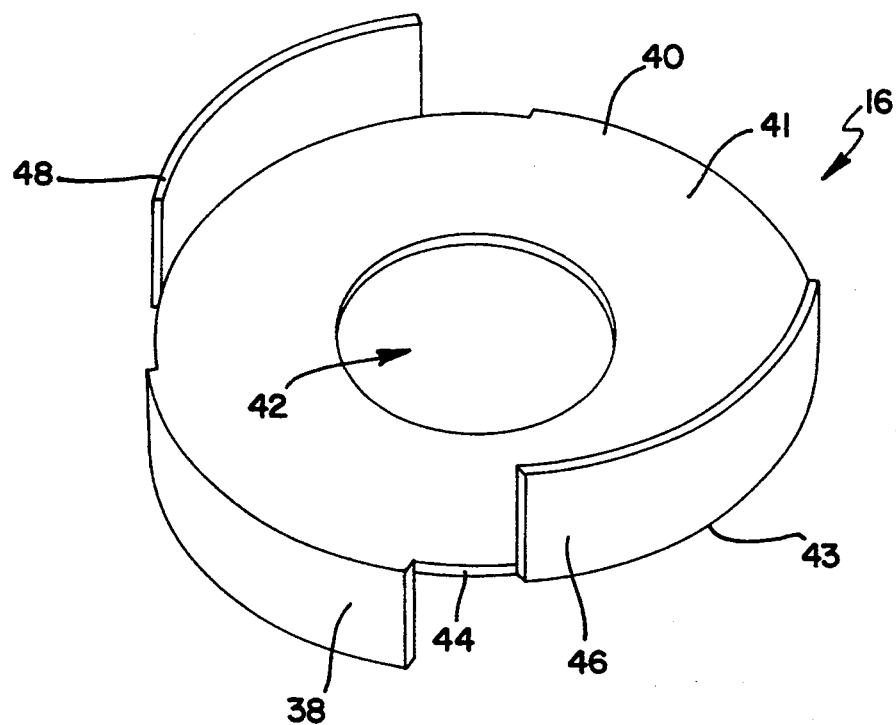
FIG. 3 is a perspective view of a first embodiment of an anti-wrap washer in accordance with the present invention.

Referring now to FIG. 3, it illustrates a first embodiment of a washer 16 in accordance with the present invention. The washer 16 includes a body 40 in the form of an annular disk having a proximate or upper face 41 and a distal or lower face 43. The body 40 has a hole 42 adapted for receiving the bolt 20 for coupling the crossbar 18 to the drive shaft 14 (FIG. 1). The body 40 further has an outer perimeter 44. Extending from the outer perimeter 44 are flange sections 46 and 48. Also extending from outer perimeter 44, in a direction opposite the flange sections 46 and 48, is a leg 38. Not visible in FIG. 3 is a second leg analogous to the first leg 38 extending from the outer perimeter 44 in a direction opposite flange sections 46 and 48.

The flange sections 46 and 48 preferably extend from the outer perimeter 44 normal to the surface of the body 40. However, in accordance with the present invention, flange sections 46 and 48 may extend at an angle from the body 40.

Figure 4:
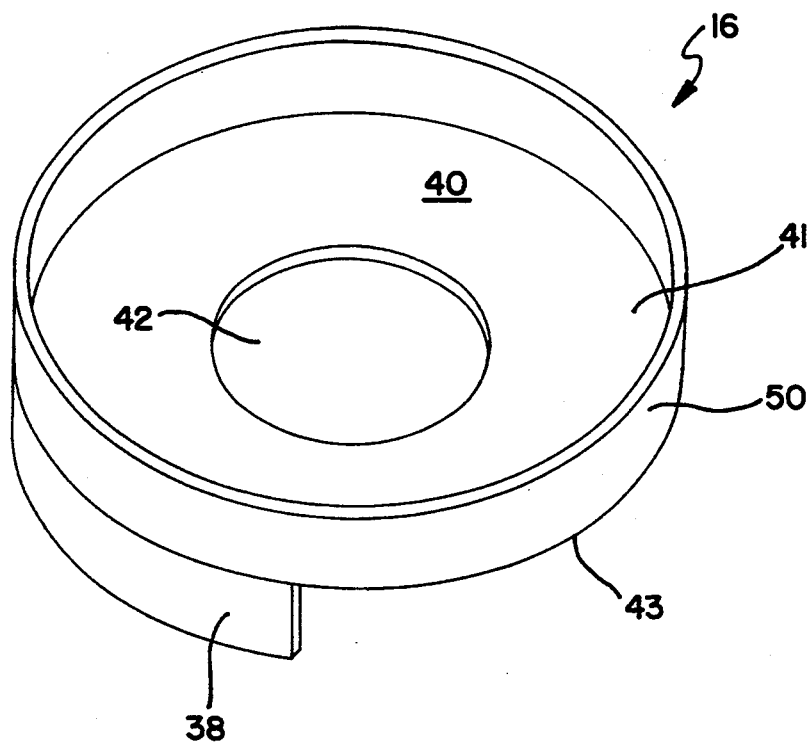
FIG. 4 is a perspective view of a second embodiment of an anti-wrap washer in accordance with the present invention.

Referring now to FIG. 4, it is a view of a second embodiment of an anti-wrap washer in accordance with the present invention. In FIG. 4, flange sections 46 and 48 (FIG. 3) have been replaced with a single continuous flange 50.

Figure 5:
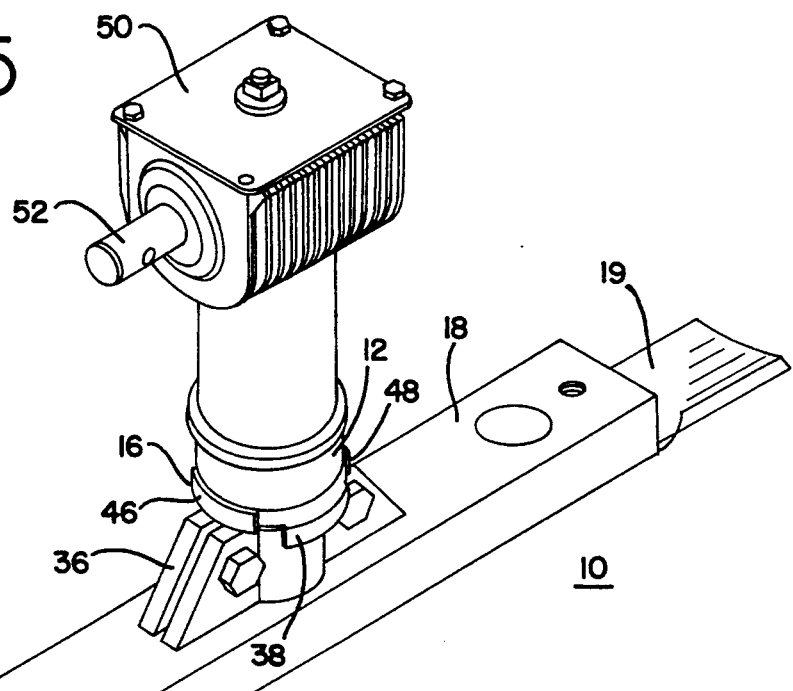
FIG. 5 is an assembled perspective view of a rotary machinery system embodying the present invention.

Referring now to FIG. 5, it shows an assembled perspective view of a rotary machinery system 10 in accordance with the present invention In FIG. 5, the rotary machinery system 10 includes a gearbox 50 driven by a horizontal drive shaft 52 for rotating the crossbar 18. The horizontal drive shaft 52 and the gearbox 50 form part of a drive system for rotating the drive shaft 14 (not visible in FIG. 5) and crossbar 18. In FIG. 5, crossbar 18 is coupled to the drive shaft 14. The legs 38 of the washer 16 engage the reinforcing brace 36 of the crossbar 18. The flange sections 46 and 48 of the washer extend upwardly from the washer body for covering at least a portion of the junction formed between the bearing housing 12 and the drive shaft 14, not visible in FIG. 5.

As the drive means rotates the drive shaft 14, the crossbar 18 also rotates. With the legs 38 engaging the reinforcing brace 36 of the crossbar 18, the washer 16 rotates responsive to rotation of the crossbar 18. As the washer 16 rotates, the flange sections 46 and 48 create a barrier to debris such as wire, vines, string and plastic. This barrier prevents rotating debris, caught on the crossbar 18, from contacting stationary components, such as the bearing housing 12. Further, the barrier formed by flange sections 46 and 48 prevents debris from penetrating this junction and damaging internal components, such as bearing 28 (FIG. 1).

Figure 6:
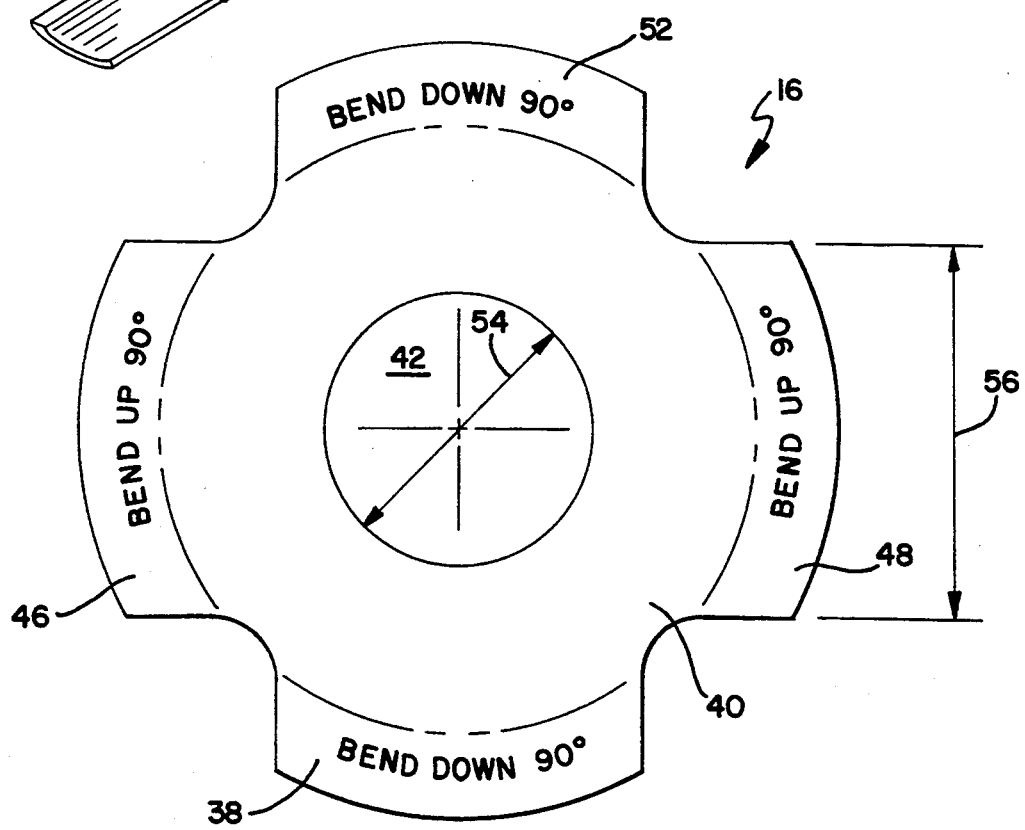
FIG. 6 is an elevation view of an intermediate subassembly of the anti-wrap washer of FIG. 2 prior to the completion of its manufacture in accordance with the present invention.

Referring now to FIG. 6, it shows a plan view of the anti-wrap washer of FIG. 2 prior to the completion of its manufacture in accordance with the present invention. Figure 6 shows the washer 16 having a body 40 in the form of an annular disk about a hole 42, and having bendable tabs for forming flange sections 46 and 48 and first leg 38 and second leg 52. FIG. 6 thus shows how the washer 16 can be manufactured from sheet steel. As will be recognized by those skilled in the art, the washer 16 could also be molded from material such as plastic, eliminating the need for forming bendable tabs to form the flange sections and legs. FIG. 6 shows the hole 42 having a diameter 54. In addition, the bendable tabs which form flange sections 46 and 48 have a chord length 56. In accordance with the present invention, the chord length 56 is preferably greater than the diameter 54. Also, the chord length 56 is preferably greater than the major cross-section dimension of the drive shaft (FIG. 1). This insures that any debris wrapped around the flange sections 46 and 48 and rotating with the washer 16 will not contact and rub against stationary components of the rotatable machinery system.

As can be seen from the foregoing, the present invention provides a rotatable machinery system, and an anti-wrap washer for use therewith, having improved resistance to damage from rotating debris. The rotatable machinery system includes an anti-wrap washer having one or more flanges or flange sections for protecting stationary components of the system as well as breakable components of the system. While the present invention has been discussed in relation to one embodiment as a rotary cutter, it will be understood that the present invention can be effectively used with any rotatable machinery system wherein a drive shaft rotates a cross member in the vicinity of stationary components for rotating the drive shaft and in the presence of debris.

While particular embodiments of the present invention have been shown and described, modifications may be made, and it is therefore intended to cover in the appended claims all such changes and modifications which fall within the true spirit and scope of the invention.

I claim:

1. A rotatable machinery system comprising:
   a rotatable cross member;
   a drive shaft coupled to said cross member;
   drive means for rotating said drive shaft;
   a bearing for rotatably supporting the drive shaft, said bearing having a bearing housing forming a circumferential junction with said drive shaft; and
   a washer, said washer having a substantially planar, ring-shaped body coaxial with said drive shaft and rotating responsive to said drive shaft, and flange means extending from said body for covering at least a portion of said junction.

2. A rotatable machinery system as defined in claim 1 wherein said flange means are integrally formed with said body.

3. A rotatable machinery system as defined in claim 2 wherein said washer further comprises means for engaging said cross member.

4. A rotatable machinery system as defined in claim 3 wherein said means for engaging comprises a plurality of legs extending from said body.

5. A rotatable machinery system as defined in claim 4 wherein each leg of said plurality of legs is integrally formed with said body.

6. A rotatable machinery system as defined in claim 3 wherein each said leg engages said cross member on opposite sides of said cross member.

7. A rotatable machinery system as defined in claim 1 wherein said flange means comprises a single, continuous flange.

8. A rotatable machinery system as defined in claim 1 wherein said flange means comprises a plurality of flange sections.

9. A rotatable machinery system as defined in claim 8 wherein each flange section of said plurality of flange sections has a length such that a chord length of said flange section is greater than [the major]a maximum cross-section dimension of said drive shaft.

10. A rotatable machinery system as defined in claim 9 wherein said drive shaft has a substantially circular cross section and a cross section diameter, and wherein said chord length of said flange is greater than said diameter.

11. A rotatable machinery system as defined in claim 10 wherein said washer engages said cross member.

12. A rotatable machinery system as defined in claim 10 wherein said washer further includes a plurality of legs for engaging said cross member.

13. A rotatable machinery system as defined in claim 12 wherein each said leg of said plurality of legs engages said cross member on opposite sides of said cross member.

14. A rotatable machinery system as defined in claim 13 wherein said flange means and said plurality of legs are integrally formed with said body.

15. A rotatable machinery system as defined in claim 14 wherein said flange means extends in a first direction from said body and said plurality of legs extend in a second direction from said body.

16. A rotatable machinery system as defined in claim 15 wherein said washer has two flange sections and two legs.

17. A rotatable machinery system as defined in claim 15 wherein said cross member is coupled to a cutting blade.

18. A rotary cutter comprising:
    a rotatable member including a cutting blade;
    a rotatable drive shaft for rotating said rotatable member and blade;
    drive means for rotating said drive shaft;
    a bearing supporting said drive shaft, the bearing having a bearing housing; and
    a washer for protecting said bearing, said washer comprising an annular disk including a hole coaxial with said drive shaft for receiving said drive shaft and rotatable with said drive shaft, said annular disk having a proximate face adjacent said bearing housing and an outer perimeter, and flange means extending from said outer perimeter for covering an adjacent portion of said bearing housing.

19. A rotary cutter as defined in claim 18 wherein said flange means comprises a plurality of flange sections extending from said outer perimeter normal to said proximate face.

20. A rotary cutter as defined in claim 18 further comprising means for engaging said member for rotating said washer.

21. A rotary cutter as defined in claim 20 wherein said washer is located between said bearing housing and said rotatable member.

22. A rotary cutter as defined in claim 21 wherein said annular disk includes a distal face and wherein said means for engaging comprises at least one leg extending from said distal face toward said member, normal to said distal face.

23. A rotary cutter as defined in claim 21 wherein said annular disk, said flange means and said means for engaging are integrally formed.

24. A rotary cutter as defined in claim 19 wherein said drive shaft has a maximum cross section dimension and each flange section has a length such that said length is greater than said maximum cross section dimension.

25. A washer for use in rotatable machinery, said rotatable machinery having a rotatable member, a rotatable drive shaft for rotating said rotatable member, and drive means for rotating said drive shaft, said drive shaft being coupled to said drive means, and a bearing having a bearing housing coaxial with said drive shaft, said washer comprising:

an annular disk including a hole coaxial with said drive shaft and rotating with said drive shaft, said annular disk having a proximate face adjacent said bearing housing and an outer perimeter;

flange means extending from said outer perimeter toward said bearing housing for covering an adjacent portion of said bearing housing.

26. A washer as defined in claim 25 wherein said flange means comprises a plurality of flange sections extending from said outer perimeter normal to said proximate face.

27. A washer as defined in claim 26 wherein said drive shaft has a maximum cross section dimension and each flange section has a length such that said length is greater than said maximum cross section dimension.

28. A washer configured for protecting a juncture between a drive shaft and a bearing housing in which the drive shaft is rotatably supported, comprising:

a thin, flat, annular disk having a round central opening sized for a drive shaft of a rotary cutter to fit closely therethrough;

an arcuate protective flange extending from an outer peripheral edge of the disk in a direction normal to a flat upper surface thereof, the arcuate flange defining a chord greater than an outer diameter of the drive shaft; and a leg extending from an outer peripheral edge of the disk in a direction normal to a flat lower surface thereof and opposite to the direction in which the flange extends.

29. The washer of claim 28, wherein the protective flange comprises a unitary, annular flange.

30. The washer of claim 28, wherein the protective flange comprises a pair of opposed, spaced, rounded flanges each defining a chord greater than an outer diameter of the drive shaft.

31. The washer of claim 30, wherein the leg comprises a pair of opposed, spaced flanges substantially identical in shape with the protective flanges but located at positions offset from the protective flanges along the outer periphery of the disk.

32. A rotatable machinery system, comprising:

a rotatable drive shaft connected at one end thereof to a drive system;

a bearing supporting the drive shaft, including a housing forming a circumferential junction with the drive shaft;

a rotatable crossbar mounted on an end of the drive shaft remote from the end to be connected to the drive system, the crossbar having a reinforcing brace extending therefrom;

a washer mounted on the drive shaft, the washer comprising a thin, flat, annular disk having a round central opening sized for the drive shaft of a rotary cutter to fit closely therethrough, an arcuate flange extending from an outer peripheral edge of the disk in a direction normal to a flat upper surface thereof, the arcuate flange defining a chord greater than an outer diameter of the drive shaft, and a leg extending from an outer peripheral edge of the disk in a direction normal to a flat lower surface thereof and opposite to the direction in which the flange extends, the leg being configured for engagement with the brace of the crossbar such that the crossbar engages the leg and thereby causes the washer to rotate together with the crossbar, the flange of the washer being in close, conforming contact with the housing of the bearing and covering at least a portion of the circumferential junction, and the washer being clamped between the brace of the crossbar and the housing of the bearing.

33. The machinery system of claim 32, wherein the brace comprises a pair of projections extending from an upper surface of the crossbar on opposite sides of an opening in the crossbar through which the drive shaft passes.

* * * * *